(12) United States Patent
Pilu

(10) Patent No.: US 7,844,075 B2
(45) Date of Patent: Nov. 30, 2010

(54) IMAGE PROCESSING

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 738 days.

(21) Appl. No.: 11/153,648

(22) Filed: Jun. 15, 2005

(65) Prior Publication Data

US 2005/0286739 A1 Dec. 29, 2005

(30) Foreign Application Priority Data

Jun. 23, 2004 (GB) .................................. 0414064.6

(51) Int. Cl.
*G06K 9/00* (2006.01)
(52) U.S. Cl. .................. 382/103; 382/190; 382/254
(58) Field of Classification Search ................ 382/103, 382/254, 190
See application file for complete search history.

(56) References Cited

U.S. PATENT DOCUMENTS

| 5,210,799 A | * | 5/1993 | Rao | 382/103 |
| 5,689,287 A | * | 11/1997 | Mackinlay et al. | 345/427 |
| 5,940,523 A | * | 8/1999 | Cornman et al. | 382/100 |
| 2002/0178149 A1 | * | 11/2002 | Chen et al. | 707/3 |
| 2003/0026495 A1 | * | 2/2003 | Gondek et al. | 382/261 |
| 2005/0105768 A1 | * | 5/2005 | Yang et al. | 382/103 |

FOREIGN PATENT DOCUMENTS

WO   WO 2004/070658 A1   8/2004

OTHER PUBLICATIONS

Liu et al. "Automatic Browsing of Large Pictures on Mobile Devices" Microsoft Research China, MSR-TR-2003-49, Nov. 2003.*
Itti et al., "A Model of Saliency-Based Visual Attention for Rapid Scene Analysis," IEEE Transactions on Pattern Analysis and Machine Intelligence, vol. 20, No. 11, Nov. 1998.*
Search Report dated Oct. 24, 2004.

* cited by examiner

*Primary Examiner*—Bhavesh M Mehta
*Assistant Examiner*—Stephen R Koziol

(57) ABSTRACT

A method of processing image data relating to at least one image comprising using data relating to disposition and saliency of selected salient portions of the or each image, generating at least one respective saliency vector for respective said portions, and a device operable in accordance with the method.

36 Claims, 7 Drawing Sheets

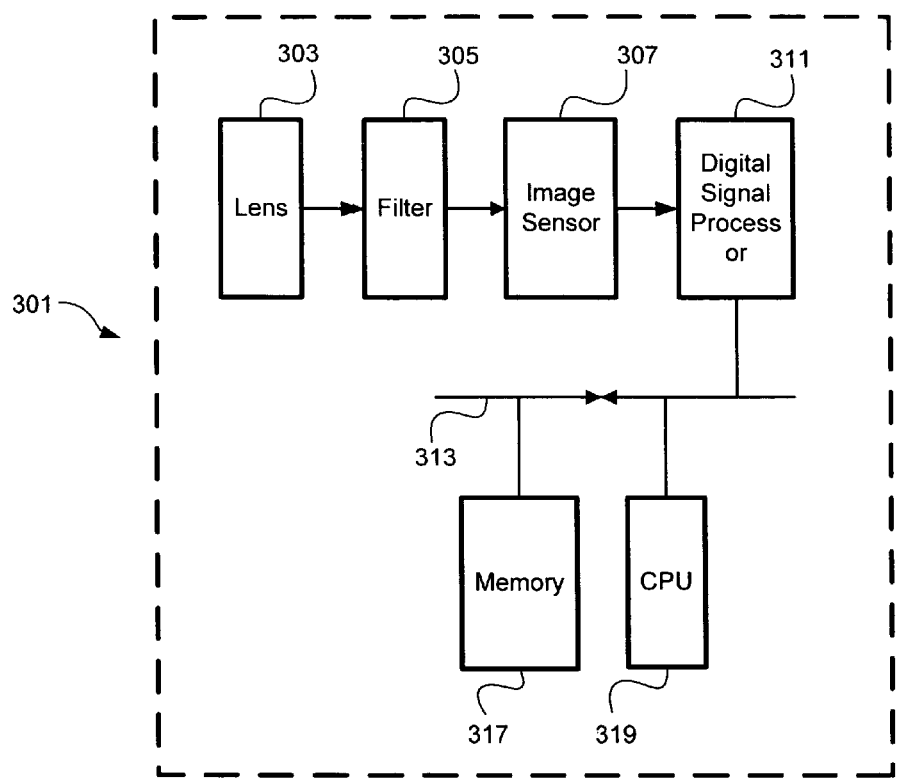
FIG. 3
4a  4b
FIG. 4a-b

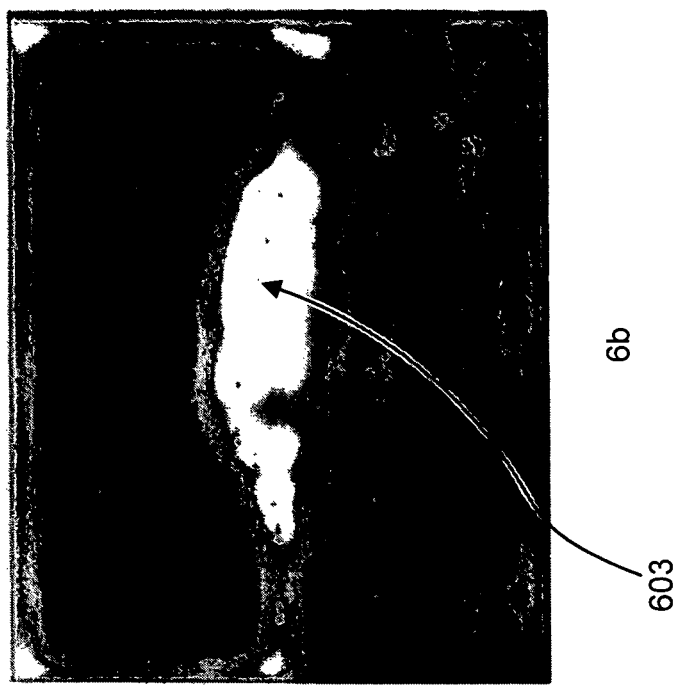
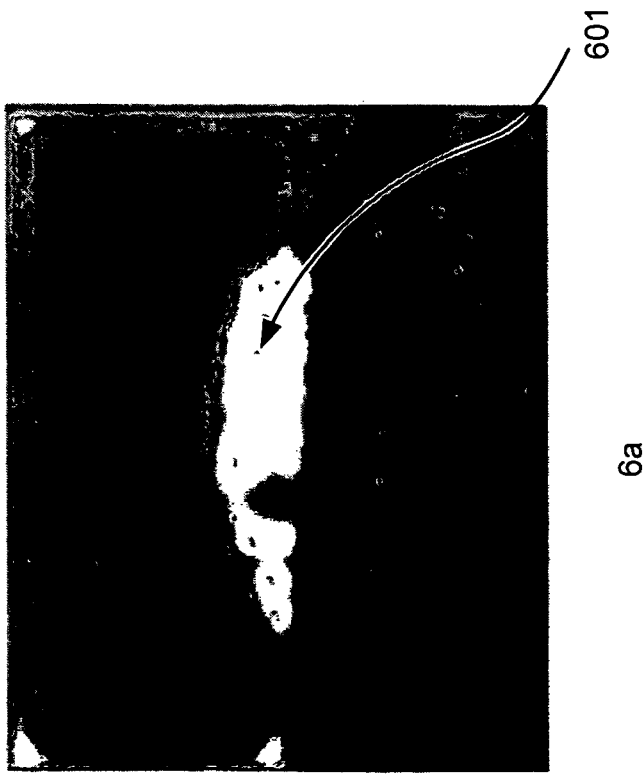
FIG. 6

IMAGE PROCESSING

TECHNICAL FIELD

The present invention relates to the field of image processing.

CLAIM TO PRIORITY

This application claims priority to copending United Kingdom utility application entitled, "IMAGE PROCESSING," having serial no. GB 0414064.6, filed Jun. 23, 2004, which is entirely incorporated herein by reference.

BACKGROUND

In certain circumstances it is desirable to be able to generate a path across a static or video image which passes through salient areas of the image for viewing. This is particularly useful in situations where viewing an entire image is not practical either due to time constraints, or because characteristics of the particular viewing platform being used are not suitable, for example, because the platform is not designed to accommodate a particular image size. In general, such a generated path will enable interesting points of the image to be displayed in preference to other areas of the image via the use of a virtual camera which follows the path across the image and which is zoomed-in with respect to the image such that only portions of the image along the path are displayed.

Such a system is particularly advantageous in mobile devices which have imaging functionality, such as mobile phones with built-in cameras, for example. The size of such devices dictates that device display screens are relatively small and therefore not particularly well suited to displaying captured or received images, especially if the images are high resolution images which contain a lot of detail.

Co-pending United Kingdom Patent application number 0104589.7 discusses the elucidation of salient locations in an image, and how salient structure can be determined from these locations. From this structure, a salient viewing path over the image can be provided.

"Automatic Browsing of Large Pictures on Mobile Devices", Microsoft Research China, MSR-TR-2003-49 discusses the use of saliency as the basis for determining what is interesting in an image, and uses the theory of information foraging to select areas of an image to explore via the use of a viewing path.

The known methods provide reasonably effective ways of displaying the salient material of an image. However, there are drawbacks. The generated display paths only monotonically explore the salient areas of an image. There is no perceptual linkage in the salient areas along a display path. Also, MSR-TR-2003-49, in particular, requires that interesting regions of an image and their extent are marked. Saliency is only used to score regions of interest.

SUMMARY

According to a first exemplary embodiment, there is provided a method of processing image data relating to at least one image comprising using data relating to disposition and saliency of selected salient portions of the or each image, generating at least one respective saliency vector for respective said portions.

According to a second embodiment, there is provided a method of processing an image comprising generating a saliency map for the image, determining a relationship of salient portions of the image using the saliency map in order to generate a saliency field, and constructing a salient path for the image using the saliency field.

According to a third embodiment, there is provided a method of generating a salient path across a plurality of images, the method comprising, for the respective images, generating respective saliency maps determining the relationship of salient portions of the images using the saliency maps in order to generate respective saliency fields for respective said images, and generating at least one salient path for respective images using respective saliency fields, wherein the salient paths are constrained at their respective end portions such that at least part of a salient path in one of said images substantially corresponds to part of a salient path in another of said images.

According to a fourth embodiment, there is provided a device operable to generate a saliency map for an image, determine a relationship of salient portions of the image using the saliency map in order to generate a saliency field, and construct a salient path for the image using the saliency field.

BRIEF DESCRIPTION OF THE DRAWINGS

For a better understanding of the present invention, and to further highlight the ways in which it may be brought into effect, various embodiments will now be described, by way of example only, with reference to the following drawings in which:

FIG. 3 is a diagrammatic representation of a device operable in accordance with the present method;

FIGS. 4a and 4b are examples of an image and of a saliency map generated for the image according to an embodiment respectively;

FIG. 6a is an example of a grouping vector field according to an embodiment overlaid with a corresponding saliency map;

FIG. 6b is an example of a reinforced grouping vector field according to an embodiment overlaid with a corresponding saliency map;

It should be emphasized that the term "comprises/comprising" when used in this specification specifies the presence of stated features, integers, steps or components but does not preclude the presence or addition of one or more other features, integers, steps, components or groups thereof.

DETAILED DESCRIPTION

Figure 1:
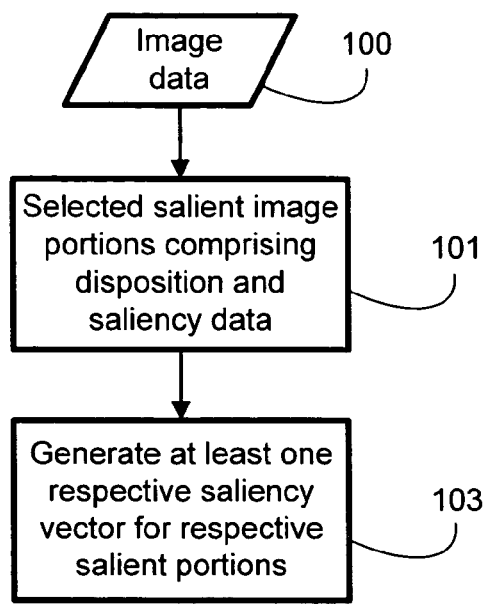
FIG. 1 is a flow chart corresponding to an aspect of the present method.

FIG. 1 is a flow chart according to an embodiment of the present method. At 101, salient portions of at least one image are selected from image data 100, which portions comprise disposition and saliency data and are used in order to generate, at 103, at least one respective saliency vector for respective said portions.

Figure 2:
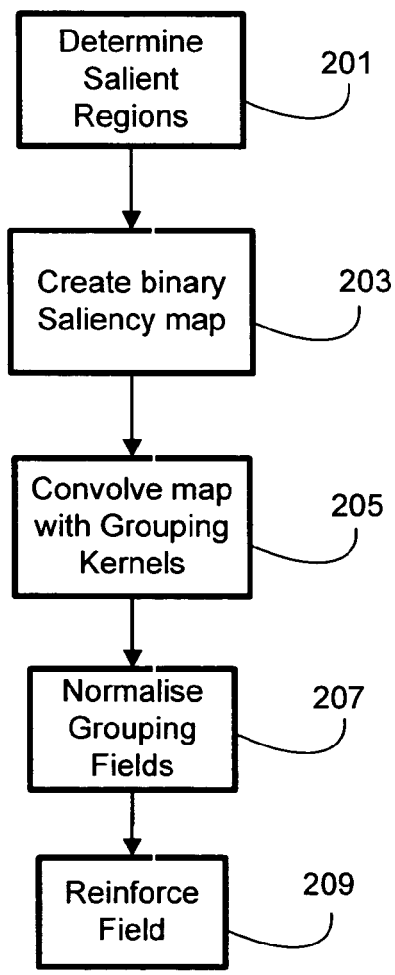
FIG. 2 is a flow chart corresponding to an aspect of the present method.

FIG. 2 of the accompanying drawings is a flow chart relating to the generation of a saliency grouping vector field according to an embodiment.

The saliency grouping vector field indicates, at each salient location in an image, and in various directions, the probability of there being other salient image locations in an image associated to it.

At 201, the salient regions of an image are determined. There are a number of methods which can be used in order to determine salient regions of an image. In a preferred embodiment, the locations are determined by generating a context-free saliency map from an image as will be described in greater detail below.

At 203, a saliency cluster map is generated from the map determined at 201. More specifically, a suitable operator, as will be described below, is applied to the saliency map of 201 in order to transform it from a discrete scalar field into a binary one with a value of 1 at the location of all local maxima, and a value of 0 elsewhere.

At 205, the saliency cluster map is convolved with a set of orientation-selective grouping kernels in order to generate a set of grouping fields which are then normalized at 207. The normalized grouping fields indicate the strength of a saliency response along the corresponding orientation, and will be described in more detail below.

At 209, the normalized grouping fields are reinforced in order to elicit the perceptual structure of the saliency maxima of the image. The perceptual structure can be a measure of the relationship between selected characteristics of image components, as might be perceived as important by a viewer of the image.

The method as described with reference to FIGS. 1 and 2 will now be described in greater detail.

A saliency map of an image is created using a suitable known method. In one embodiment the method as proposed by Itti, Koch and Niebur ("A Model of Saliency-based Visual Attention for Rapid Scene Analysis", IEEE Transactions on Pattern Analysis and Machine Intelligence, 20(11): 1254-1259, 1998) is used in order to generate a suitable saliency map of an image, or more precisely, a context-free interest map from an image.

It will be appreciated by those skilled in the art that a suitable saliency map of an image can be generated using a number of alternative methods. For example, the work of C. M. Privitera and L. W. Stark ("Evaluating image processing algorithms that predict regions of interest" Pattern Recognition Letters, 19(11):1037-1043, September 1998, and "Algorithms for defining visual regions-of-interest: Comparison with eye fixations", IEEE Transactions on Pattern Analysis and Machine Intelligence, 22(9):970-982, September 2000) has also attempted to define a model for bottom-up saliency.

The method described herein (the Itti, Koch and Niebur method), which is based on biologically plausible principles of saliency elucidation, combines multiscale image features into a single topographical image map. The method will not be described in detail since only the resulting saliency map is of importance for the present method, and not the route used to obtain it from an image to be processed.

FIG. 3 of the accompanying drawings is a diagrammatic representation of an exemplary device operable in accordance with the present method. More specifically, FIG. 3 represents an exemplary imaging module of a device such as a digital camera or a mobile telephone or PDA with imaging functionality. It will be appreciated, however, that the present method may be implemented by a device which does not include imaging functionality, and which has received an image to be processed from a remote (from the device) location such as a camera or other image capture device. Such an image may be received using known wired (e.g. LAN, internet etc) or wireless (e.g. WiFi, Bluetooth etc) techniques.

The imaging element 301 comprises a lens assembly 303, a filter 305, image sensor 307, and a digital signal processor 311. An image or scene of interest is captured from light passing through the lens assembly 303. The light may be filtered using the filter 305. The image is then converted into an electrical signal by image sensor 407 which could be either of the devices mentioned above. The raw image data is then passed to the digital signal processor (DSP) 311.

Further, with reference to the device 301 of FIG. 3, a bus, or similar, 313 is operable to transmit data and/or control signals between the DSP 311, memory 317, and the central processing unit (CPU) 319.

Memory 317 may be dynamic random-access memory (DRAM) and may include either non-volatile memory (e.g., flash, ROM, PROM, etc.) and/or removable memory (e.g., memory cards, disks, etc.). Memory 317 may be used to store raw image digital data as well as processed image digital data. CPU 319 is a processor which can be programmed to perform various tasks associated with the device 301.

It should be noted that there are many different configurations for the imaging element of FIG. 3. In one embodiment, the CPU 319 and the DSP 311 may reside on a single chip, for example. In other embodiments, the CPU 319 and DSP 311 reside on two or more separate chips, for example. Further combinations are possible, but it should be noted that the exact architecture of the imaging element 301 and/or the components therein as outlined above are not intended to be limiting, and are merely presented in order to exemplify the typical image capture elements of a mobile device with which the present method will function.

For example, the CPU 319 may be in addition to a CPU of the mobile device, or may perform tasks additional to those as required by the imaging element. Memory 317 may also be used for other functions of the mobile device, for example.

A device devoid of imaging functionality operable in accordance with the present method would be similar to that depicted in FIG. 3, except that it would not have elements 303, 305 and 307, at least.

FIGS. 4a and 4b of the accompanying drawings are an image and the corresponding saliency map respectively, obtained using the method of Itti, Koch and Niebur.

It will be appreciated by those skilled in the art that FIG. 4b is merely a representation of a suitable saliency map and is not intended to be limiting. In FIG. 4b, salient areas are depicted in white (and shades thereof), with less salient areas of the image 4b being depicted by darker areas. In this case, each location of the image 4b has a corresponding saliency value associated with it, which has been graphically represented in 4b. The generation of an image such as FIG. 4b does not constitute the generation of a saliency map per se, it is a representation of the saliency map. In general, a saliency map comprises data corresponding to the disposition and saliency of selected portions in an image. Such portions may be pixels, voxels, or larger or smaller areas of an image, for example.

Following generation of a suitable saliency map such as that of FIG. 4b using a suitable method such as that described above, an operator M is applied to the map in order to transform the discrete scalar field of the map into a binary one.

In a preferred embodiment, M is a matrix, the elements of which are arranged in order to effect the transform from a discrete scalar field to a binary one, and which is applied to a matrix representation of the saliency map in order to provide a processed saliency map.

All local maxima of the saliency map are assigned a value of 1 following the application of the operator, with all other areas having a value of zero. Salient locations in an image are therefore determined by non-maxima suppression of the saliency map. In this manner, a saliency cluster map is generated.

If the saliency map is represented as a matrix S, the processed saliency map may be represented as a saliency cluster map matrix $S_{max}$ which is therefore generated according to:

$$S_{max} = M \cdot S$$

It will be appreciated that alternative representations of the saliency map, the operator M and the saliency cluster map are possible. For example, each may be a string of data, binary or other, or the above may be represented by a suitable digital or analogue signal.

From the saliency cluster map, saliency responses can be weighted using a weighting kernel applied to the map. The responses provide an indication, from each salient location in various directions, of the probability of finding other salient locations associated with the location in question.

In a preferred embodiment, a parametric lemniscate kernel is used to weight saliency responses. The kernel is an orientation-selective grouping kernel. Using a polar coordinate representation, for example, for a response at a distance $\rho$ and angle $\theta$ from the current location the kernel $k(\rho,\theta)$ is defined as:

$$k(\rho, \theta) = e^{\frac{1}{2}\left(\frac{\rho}{\sigma}\right)^2 \cos^{2n}(\theta)}$$

for $-90° \leq \theta \leq 90°$, with the output of the kernel defined as zero elsewhere. The parameter $\sigma$ defines the spatial support of the kernel whereas n is associated to the orientation selectivity. In a preferred embodiment, a set of four rotated grouping kernels $k_n$ (n=1 ... 4) is used. The set covers a finite number of orientation angles $\alpha_n = \{0, 90, 180, 270\}$. Each rotated kernel is therefore obtained from $k_n(\rho, \theta - \alpha_n)$. It will be appreciated by those skilled in the art that a set of fewer or greater orientation angles can be used in order to generate the rotated grouping kernels. In addition, a lemniscate kernel such as that described above need not be used, and any suitable kernel adapted to provide a weighting of saliency responses in a number of directions is appropriate. The above, and the following discussion is not, therefore, intended to be limiting.

Each of the kernels, $k_n$, are convolved with the map $S_{max}$ in order to create a set of four grouping fields $G_n'$ such that:

$$G_n' = k_n * S_{max}$$

In a preferred embodiment, the $G_n'$ are normalized at each salient location (x,y) in order to provide a normalized set of grouping fields $G_n$ according to:

$$G_n = \frac{G_n'(x, y)}{\sum_{n=1}^{4} G_n'(x, y)}$$

such that $$\sum_{n=1}^{4} G_n(x, y) = 1,$$

indicating the strength of each response along the corresponding orientation.

Note that given $S_{max}$ can be represented by a superposition of m Dirac pulses at the salient locations $M_i$ of an image, the grouping fields can also be represented by the superposition of the n grouping kernels placed at the $M_i$.

Also, since a sparse matrix is used, and more specifically a matrix whose elements are non-zero only at the location of the maxima, convolution can be speeded up considerably by taking into account only the non-zero elements of a matrix representation of $S_{max}$, effectively implementing a weighted sum only at the locations of the maxima. It will be appreciated by those skilled in the art that the convolution notation has been used only for clarity.

The grouping kernels substantially capture the relationship between saliency maxima, in particular when two or more fall within the support of the kernel. However, in most cases there is considerable ambiguity in the responses. This is generally due to the fact that the saliency model used includes no provision for direct orientation information.

According to a preferred embodiment, in order to elicit a structure of the saliency maxima, an iterative reinforcement process is used which progressively reinforces perceptually aligned components of the field and inhibits components that exhibit no perceptual structure.

Advantageously, the reinforcement iterations consist of the following updates of the fields with respect to the location $(x_i, y_i)$ of a maxima i:

$$G_n(x_i, y_i) \leftarrow G_n(x_i, y_i) \cdot [1 + \mu R_n(x_i, y_i)]$$

where the $R_n(x,y)$ are a set of scalar reinforcement functions for each direction which are positive when the nth component of the field is to be reinforced, and negative when it is to be inhibited. The parameter $\mu$ is a gain factor, and is advantageously set to a value substantially less than unity ($\mu \ll 1$).

The reinforcement function implements two simple principles: a) reinforcing the strongest field component at each location and b) reinforcing a component if it has other neighbors whose strongest field components have the same orientation.

In a preferred embodiment, the reinforcement functions are normalized functions with respect to the set of reinforcement functions $R_n'$. The set of normalized reinforcement functions $R_n$ for each direction n is thus given by:

$$R_n(x, y) = \frac{R_n'(x, y)}{\sum_{n=1}^{4} R_n'(x, y)}$$

where, from an un-normalized saliency map S of an image being considered, $$R_n'(x,y)=k_n*(G_n-\overline{G}).$$

The scalar field $$\overline{G}\left(=\frac{1}{4}\sum_{n=1}^{4}G_n\right)$$

represents the average orientation response at each location. Accordingly, the value $G_n-\overline{G}$ is positive when a response at a particular location and in a particular direction is above the average response $\overline{G}$, thereby ensuring that the strongest responses are favoured, and negative when a response at a particular location and in a particular direction is below the average response $\overline{G}$ (so that weak responses are inhibited).

The convolution (or similar processing) with the grouping kernels $k_n$ ensures that neighboring components along the same direction that are also dominant provide a positive contribution to $R_n'$, whereas those which are not as dominant have a negative contribution.

Figure 5:
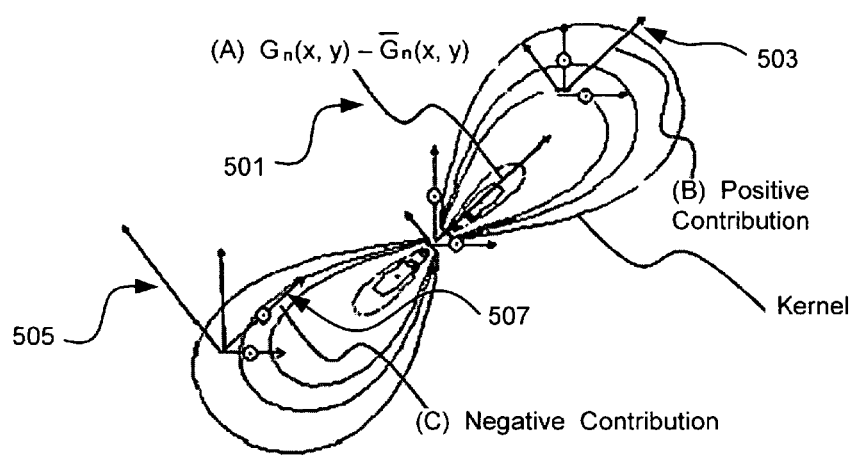
FIG. 5 is a diagrammatic representation of a grouping kernel according to an embodiment.

FIG. 5 of the accompanying drawings is a diagrammatic representation of a reinforcement update procedure according to a preferred embodiment.

At location A, there are four components of the vector field $G_n-\overline{G}$ at a point (x,y). Negative contributions are indicated by circled minus signs. In the example of FIG. 5, the strongest response at point A is labeled as 501. At two other locations, B and C of FIG. 5, the respective components are also shown. At B there is a strong positive component 503 in the same direction as 501, whereas at C, the strongest response 505 is in a different direction to 501 and 503, with a negative contribution 507 in the direction of 501, 503 (due to the fact that the response along this direction was below average).

By convolving with the kernels $k_n$, the contributions are weighted depending on the nature of the other responses falling within the support of the particular kernel used at the point in question. FIG. 5 shows a preferred lemniscate grouping kernel. As mentioned, alternative weighting kernels can be used.

In the specific case of FIG. 5, the overall effect is that $R_n(x,y)$ is slightly positive as the kernel shown, when convolved with the responses shown, will give a larger weighting to the responses at B rather than C since B is aligned with the reference direction 501, and is closer to the location (x,y) in question.

FIG. 6a of the accompanying drawings shows a saliency map obtained from an image with the grouping fields overlaid. The grouping field comprises at least a vector, one of which is indicated by the reference 601 on FIG. 6a.

FIG. 6b shows the result after the reinforcement process has been applied to the grouping fields of FIG. 6a. A reinforced vector is indicated at 603.

Following generation of a reinforced saliency grouping vector field as described above, a path across an image can be generated using the field in order that perceptually structured salient locations of an image can be displayed in preference to other areas of an image.

This is particularly advantageous if a captured image is to be displayed using a device with a relatively low resolution display.

For example, in a digital camera, or other mobile device incorporating imaging functionality such as a mobile station (mobile telephone), personal digital assistant (PDA), or pager for example, such as that including the functionality described with reference to FIG. 3, a captured image can be displayed using a display of the device. The nature of such devices implies that such a display is necessarily small with respect to the dimensions of the device in order to enable the conservation of power of the device, and space on the device.

Accordingly, when an image is displayed using the device some image information can be lost, or may not be directly viewable due to the nature of the possibly small, low resolution, device display. According to a preferred embodiment, such a displayed image is an image captured by the device itself, or is an image received by the device, such as an image captured by other means and uploaded to the device, for example.

In a preferred embodiment, a zoomed-in (with respect to an image) window is translated across an image, the window following a salient path generated in association with the grouping vector field. Therefore, a portion of an image is displayed instead of the entire image, and the displayed portions, as defined by the size of the translation window and the salient path, exhibit a structure such that notionally related components of an image are viewed substantially together.

Figure 7:
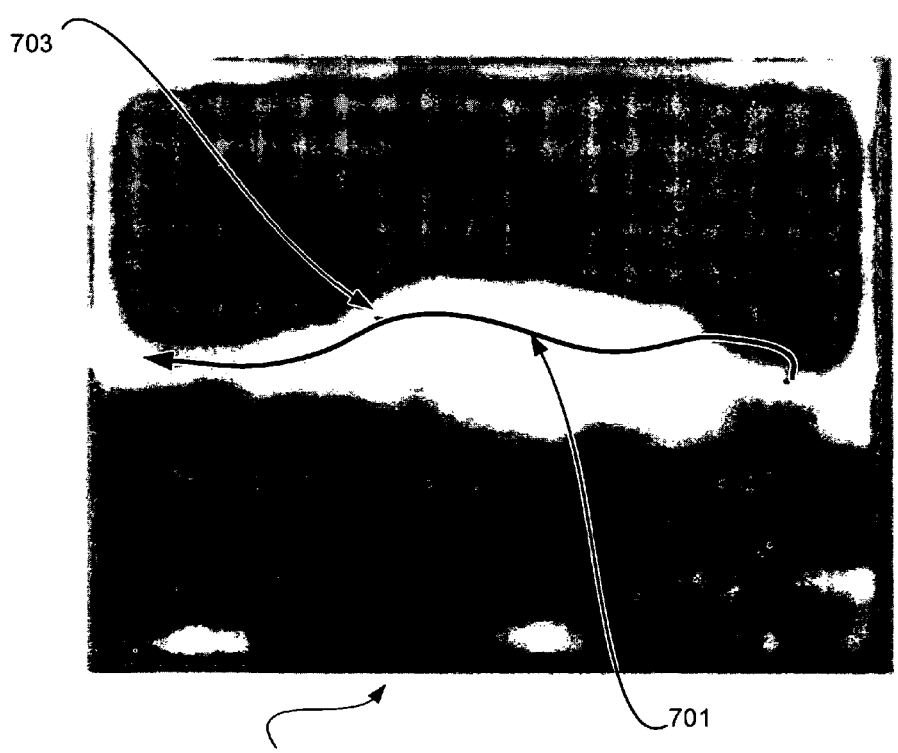
FIG. 7 is a diagrammatic representation of a reinforced grouping vector field according to an embodiment overlaid with a corresponding saliency map further indicating a corresponding salient path according to an embodiment.

FIG. 7 of the accompanying drawings is a diagrammatic representation of a salient path 701 across an image 700 generated in association with the grouping vector field for the image.

The path 701 is substantially aligned with a subset of the vectors at salient portions of the image, one of which is indicated at 703. A preferred direction of the path is indicated by the arrow of the path 701. The preferred direction substantially follows the direction of the vectors of the grouping vector field of the image and generally passes through the saliency maxima corresponding to the salient portions.

Constraints on the generation of the path 701 can be imposed, such as requiring that it is a smooth curve. This may necessitate that the path just 'misses' a saliency maxima in some instances, thereby providing a smooth curve which is more suited to a salient path for use in a viewing device where 'jerks' in the salient path would be detrimental to the viewing of the selected image locations.

Other constraints/criteria can also be imposed when generating the path. For example, the path can be constrained to be the curve of minimum length which passes through the desired saliency maxima as defined by the grouping vector field, but which is smooth and therefore has continuous derivatives up to the order required. It will be appreciated by those skilled in the art that other constraints/criteria can be applied when generating a salient path. Also, it will be appreciated that alternative salient paths to that shown in FIG. 7 are possible. Path 701 is depicted merely as an example of a salient path across the image 700 and it is not intended to be limiting.

A grouping vector field for an image will generally preserve a number of dominant salient positions thereby creating a field from which numerous salient paths can be generated.

Each possible salient path across an image with an associated grouping vector field can be selected for display based on a ranking of paths according to a number of criteria. For example, each possible path can be ranked according to a time taken to traverse the salient path with respect to other paths for the image, with either the path with the longest or shortest time being ranked highly, and other paths being ranked accordingly thereafter.

Alternatively, a possible set of salient paths can be ranked according to the overall saliency of a path, where the overall saliency could provide a measure of saliency with respect to the density of salient locations which are traversed by the path. For example, two salient paths can be generated for an image using the grouping vector field for that image, however, one path may encounter more salient locations than the other. In this respect, the paths can be ranked according to the number of salient locations occurring along the particular salient path. Other alternatives are possible.

According to a preferred embodiment, a ranking can be adjusted according to received preferences. For example, if received preference relates to a path of shortest length, the paths may be ranked accordingly, with the path of shortest length being ranked highest and all other paths ranked accordingly. Other alternatives are possible.

It will be appreciated that various other ways of ordering a set of possible paths can be employed, and that the above are not intended to be limiting.

Figure 8:
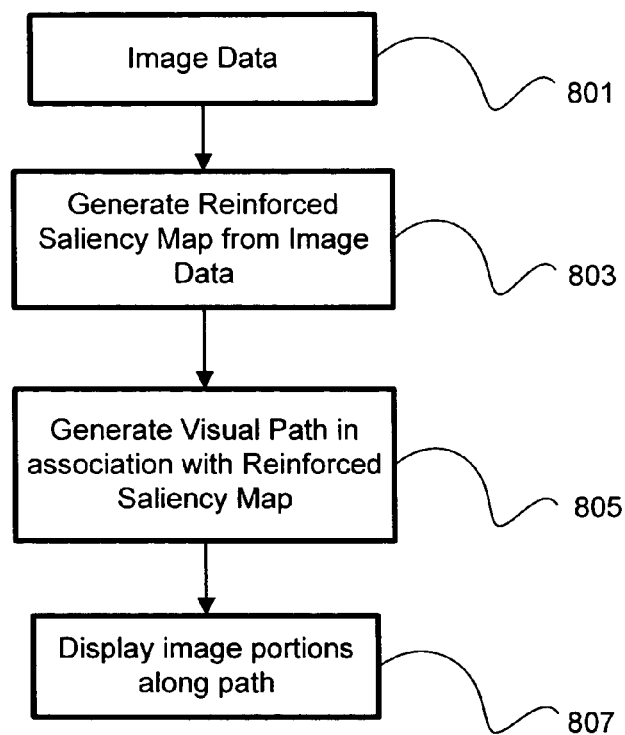
FIG. 8 is a flow chart representing an aspect of the present method.

FIG. 8 of the accompanying drawings is a flow chart representing a procedure for generating a salient path in an image capture device such as those described above.

At 801, image data relating to an object or scene is received by a device. The data can relate to an image of an object or scene captured by the device itself in which case the data is preferably 'received' in a processor of the device, or captured by another device, in which case the data is received by the device using a communications medium such as a radio frequency telecommunications network, for example. Other alternatives are possible as are customary in the art such as receiving data over a Bluetooth link established between devices, receiving data via the internet or using an infra-red link, for example.

At 803, the received image data is then processed in the device in order to generate a reinforced saliency map relating to the image as described above.

At 805, a salient path is generated in the device using the map of 803. As described above with reference to FIG. 7, the salient path is substantially aligned with a subset of the vectors at salient locations of the image, with the preferred direction of the path following that of these vectors. Each vector comprises data relating to a disposition and direction of a salient portion of the image.

At 807, parts of an image along the path of 805 are displayed using a display of the device. Preferably, and as described above in more detail, a zoomed-in window is translated across the image along the path, such that only salient locations of an image are viewed.

Although the above implementation has been described with reference to processing image data in device, it will be appreciated that any processing of image data can be performed remotely from the device.

For example, data relating to a captured image can be uploaded to a remote (from the capture device) processing device such as a server, for example, which is operable to process the data in order to generate a reinforced saliency map as described above. Such uploading can be performed in any conventional manner using a wired or wireless communications link. The server can be operable to generate a salient path across an image associated with the data in order to provide salient portions of an image suitable for viewing on low-resolution and/or small display. The data relating to the salient path and the relevant image portions can be sent to a device for viewing using a number of communications methods as described above.

Further alternatively, the remote processing device can be operable to generate the reinforced saliency map from image data, which data is then received by a device in order that it can use the map in order to generate a salient path across the image in question. Variations are possible, with the remote processing device and the mobile device operable to perform various tasks in association with one another in order to generate a salient path for use on the mobile device.

Figure 9:
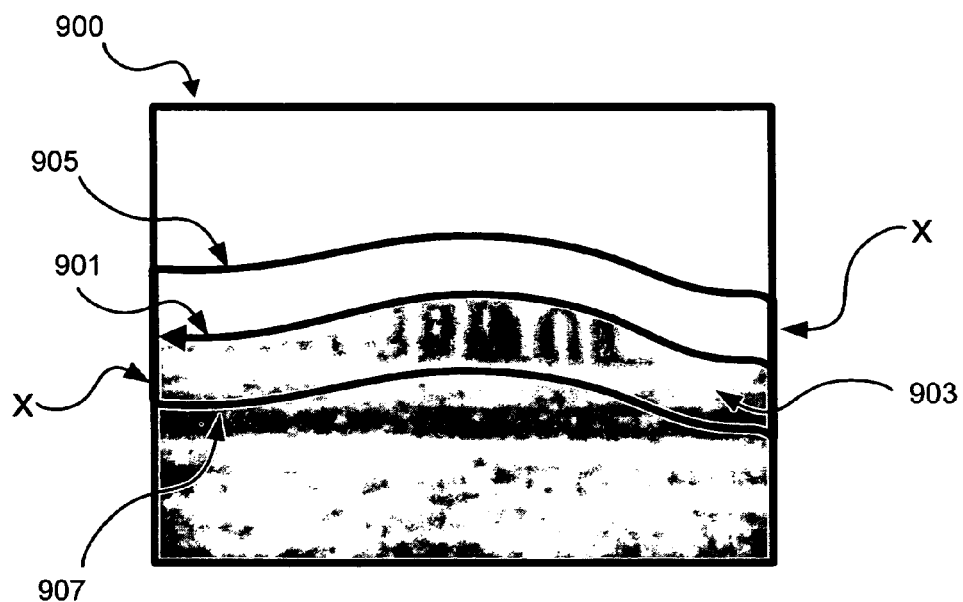
FIG. 9 is an image with an overlaid salient path and corresponding display portions.

FIG. 9 of the accompanying drawings is a diagrammatic representation of an image 900 showing an overlaid salient path 901 and the corresponding portion (shown enclosed in white lines) of the image 903 displayed on a display of a device (not shown). The portion 903 shown corresponds to the area of the image 900 displayed as a result of a path followed by a zoomed-in window of a specific size. It will be appreciated that different devices will have different display sizes and different processing capabilities, and consequently the size of the zoomed-in window can be adjusted accordingly. The portions of FIG. 9 are not intended to be limiting and are only shown in the manner in which they are for the sake of clarity. A dimension of a zoomed-in window corresponds to the width x shown on the figure. The lines 905,907 therefore represent the path followed by a side of a zoomed-in window of height x which follows the path 901.

In this manner, salient locations of the image 900 as determined using the method as described above are viewed by a zoomed-in window which is translated along the generated salient path 901 for the image 900.

In a preferred embodiment, a user of a mobile device is able to input the time available for viewing the salient locations of an image. The speed at which a zoomed-in window is therefore translated over the salient path 901 is adjusted so that the entire path is traversed in the given time. For a display of a given refresh rate, this will result in different areas of the portion 903 being displayed at different times. For example, if a relatively long time for viewing is selected, then the path 901 will be traversed slowly and more areas of the portion 903 will be displayed. If a shorter time is specified, the path 901 is traversed more quickly, and therefore less areas of the image portion 903 will be displayed in the time available. A minimum (and/or maximum) viewing time can be preset in a memory of the device (not shown) in order to avoid the case where the path is traversed too quickly.

It will be further appreciated that the present method is applicable in situations in which a dynamic translational window can be used, such that the zoom factor of the window varies along the length of the salient path in response to different areas of saliency, for example.

The present method is also useful when applied to multiple related images such as those relating to a panoramic image, or a sequence of images making up a video.

For example, if a panoramic image is to be generated from a plurality of separately captured images, such that each image relates to the scene or object from which the panorama is desired, the present method is able to generate a salient path for each image independently, or following the generation of the panoramic image.

In general, the panoramic image will be generated using known techniques such as stitching, for example. Once a panorama has been generated, a salient path can therefore be generated for the panoramic image proper.

Alternatively, if a salient path is generated for each individual image from which the panorama is to be generated, it may be desirable to align the beginnings and ends of the salient paths for the images. In this respect, the images need not be stitched, but a virtual panorama tour can be implemented using a suitable display with the appropriate processing.

Figure 10:
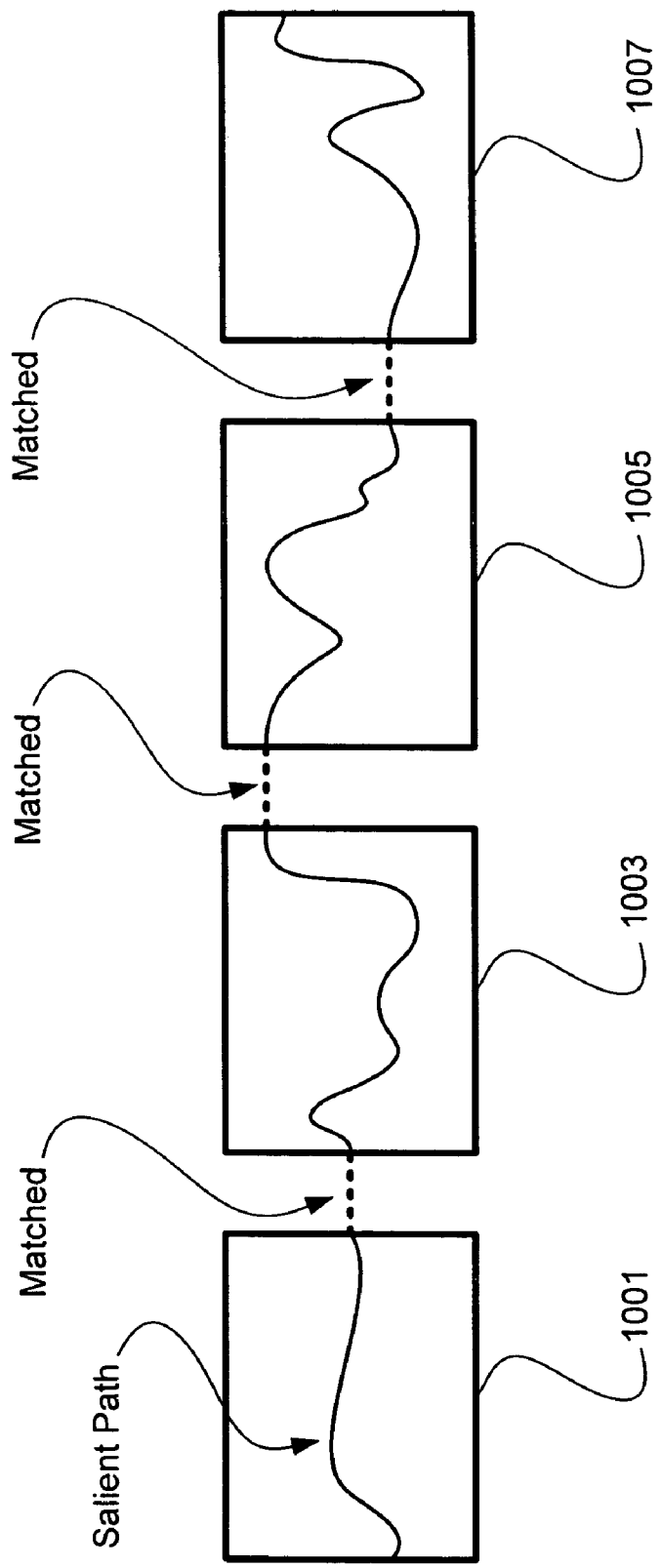
FIG. 10 is a diagrammatic representation of the present method as applied to a plurality of related images.

More specifically, and with reference to FIG. 10 of the accompanying drawings, images 1001,1003,1005 and 1007 are images from which a panorama of an object or scene may be generated. If a virtual panorama tour is be implemented using the images, it is desirable for the end of the salient path of 1001 to correspond with the beginning of the salient path for 1003, the end of the salient path for 1003 to correspond with the beginning of the salient path for 1005 and so forth.

Suitably corresponding paths are shown in FIG. 10. In this manner, a salient path for each image can be followed and portions of the corresponding image displayed on a suitable display. When the end of a salient path for one image is reached, the display begins to display portions of the next image following the salient path from this next image thereby giving the illusion that a panorama of the object or scene was captured. The salient paths, as followed, have the effect of a continuous salient path across the panorama which would be generated by joining the images.

The images of FIG. 10 can be stitched as explained above, in which case the matched salient paths generated for each image can be used, or a new salient path for the entire stitched panorama can be generated. Any salient path can be adjusted to take account of any overlapping or translation of images as a result of obtaining a panorama.

More or less images than that shown in FIG. 10 may be used, and the nature of the images and the generated salient paths thereon is not intended to be limiting.

In a preferred embodiment, two paths can be said to substantially correspond if a path which would result from them being joined is substantially continuous, or if, when two images are joined in order to form a portion of a panorama, the distance between the ends of the respective salient paths is less than a certain 'mismatch threshold', for example. Such a threshold can be of the order of millimeters, for example, or can be determined on a case by case basis taking into account the granularity of image detail in a panorama or its constituent images. A combination of the above may also be appropriate in certain circumstances.

In the case of video, the present method may be applied to consecutive image frames of the video. In this respect, a generated salient path will be a temporal path, as opposed to the above described implementations which describe spatial salient paths. More specifically, a salient path will be generated across a plurality of image frames, each of which can be varying with respect to time. From the reinforced saliency map for an image of a video, a salient location is selected, either the most salient location of the image in question, or a location selected using input from a user, which can be based on ranked locations in line with that described above.

Locations are selected for other images from which the video is comprised, and a salient path linking these locations is then generated. A zoomed-in window can therefore be translated 'through' the images comprising the video such that only a salient portion of the video is displayed.

It is not necessary for each consecutive image to be processed in this manner. In certain circumstances, it will be appropriate or desirable only to process, for example, every 6th image. The salient path can still extend through all images of the video, but the points defining its path through the images will therefore only occur every 6th image in this example.

Figure 11:
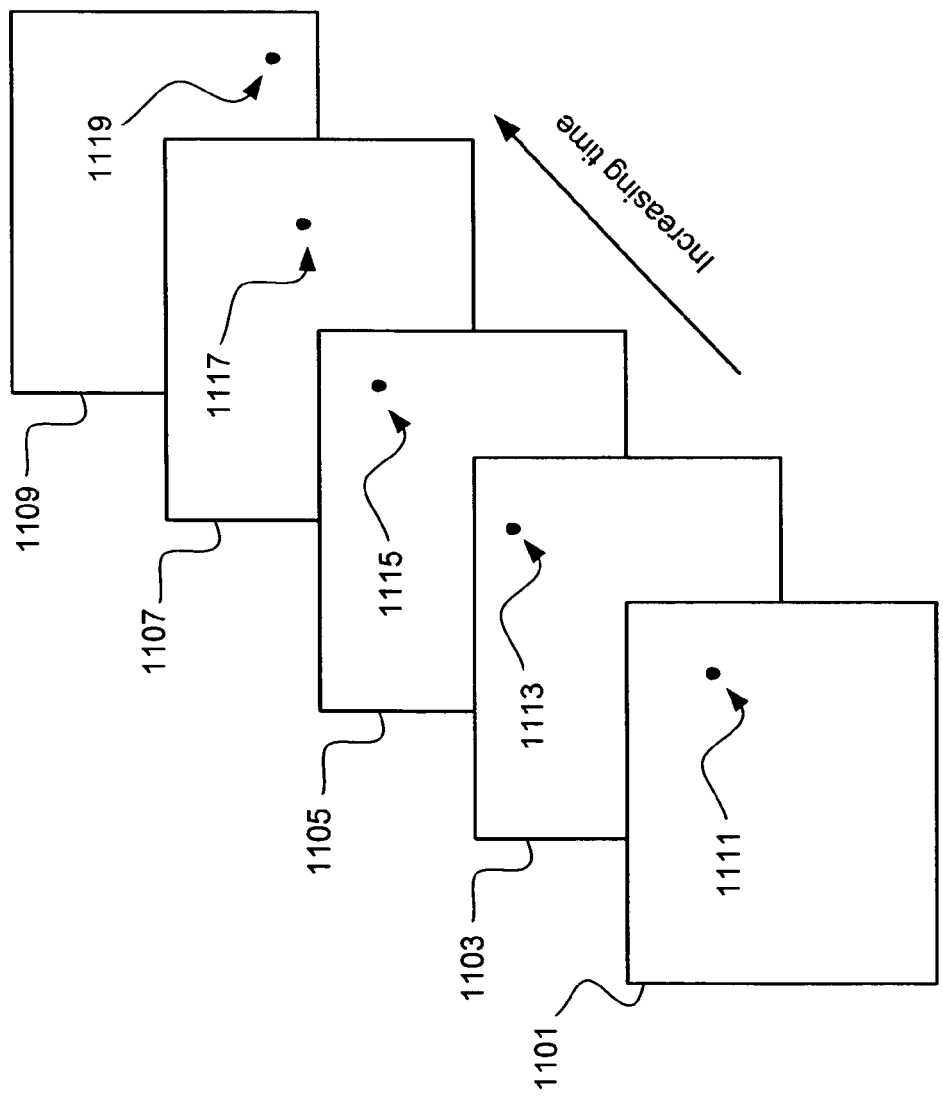
FIG. 11 is a diagrammatic representation of the present method as applied to a plurality of related images.

FIG. 11 is a diagrammatic representation of a number of images from which a video is comprised. There are five such images 1101, 1103, 1105, 1107 and 1109. It will be appreciated that many more of such images will be present in a video. Only five images are depicted for the sake of clarity.

In the example of FIG. 11, each image 1101, 1103, 1105, 1107 and 1109 includes a point thereon 1111, 1113, 1115, 1117, 1119 which has been selected using the saliency field for that image. Each point may be the most salient point in that particular image, or each point may be the most appropriate point in each image which defines a continuous salient path through the images 1101, 1103, 1105, 1107 and 1109. In either case, certain constraints may be imposed on a path generated for a video such as requiring that it is a smooth curve. This may necessitate that the path just 'misses' a saliency maxima in some instances, thereby providing a smooth curve which is more suited to a salient path for use in a viewing device where 'jerks' in the salient path would be detrimental to the viewing of the selected image locations.

Other constraints/criteria can also be imposed when generating the path. For example, the path can be constrained to be the curve of minimum length which passes through the desired image points 1111, 1113, 1115, 1117, 1119, but which is smooth and therefore has continuous derivatives up to the order required. It will be appreciated to those skilled in the art that other constraints/criteria can be applied when generating a salient path.

Figure 12:
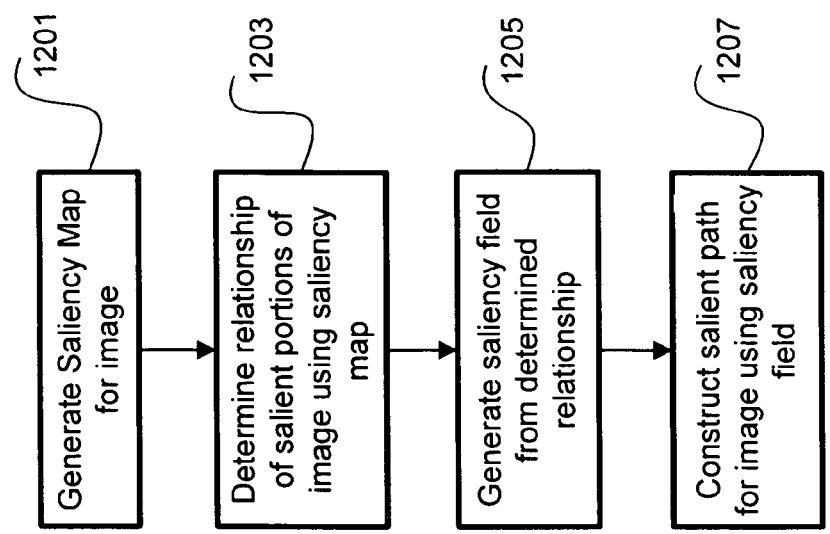
FIG. 12 is a flow chart corresponding to an aspect of the present method.

FIG. 12 is a flowchart corresponding to an aspect of the present method.

At 1201 a saliency map for image (not shown) is generated. At 1203 a relationship of salient portions of the image is determined using the saliency map from which a saliency field is generated at 1205. At 1207 a salient path for the image is constructed using the saliency field.

The invention claimed is:

1. A method of processing image data relating to at least one image comprising:
   using data relating to disposition and saliency of selected salient portions of the at least one image;
   generating, by a computing device, at least one respective saliency vector for respective said portions; and
   selecting a portion of the at least one image for presenting for viewing based on the at least one respective saliency vector and on a determination that the image is not directly viewable due to properties of a display on which the image will be provided.

2. A method as claimed in claim 1, further comprising:
   weighting said data relating to disposition and saliency of said selected salient portions using at least one respective orientation-selective weighting function.

3. A method as claimed in claim 2, wherein the or each orientation-selective weighting function is a two-dimensional lemniscate Gaussian kernel.

4. A method as claimed in claim 1, further comprising:
   constructing at least one salient path between said selected salient portions using at least one said saliency vector.

5. A method as claimed in claim 4, further comprising:
   displaying parts of the or each image lying on the or each salient path.

6. A method as claimed in claim 1, further comprising:
   using said data relating to disposition and saliency of said selected salient portions of the or each image, generating the data relating to local saliency maxima of the or each image.

7. A method as claimed in claim 6, wherein the local saliency maxima have a saliency above a predetermined threshold value.

8. A method of processing an image comprising:
   generating, by a computing device, a saliency map for the image;
   determining a relationship of salient portions of the image using the saliency map in order to generate a saliency field;
   constructing a salient path for the image using the saliency field; and
   selecting a portion of the image for presenting for viewing based on the salient path and on a determination that the image is not directly viewable due to properties of a display on which the image will be provided.

9. A method as claimed in claim 8, further comprising: determining local saliency maxima of the image using the saliency map, wherein determining a relationship of salient portions of the image comprises determining the relationship of salient portions of the image using said determined local saliency maxima.

10. A method as claimed in claim 8, wherein the relationship of the salient portions of the image is determined using a grouping kernel.

11. A method as claimed in claim 10, wherein the determination of the relationship of salient portions further comprises:
generating a set of orientation selective grouping kernels from the grouping kernel;
using the saliency map and respective orientation selective grouping kernels, generating a set saliency fields comprising the relationship of the salient portions of the image in the respective orientations; and
generating a composite saliency field from the saliency fields.

12. A method as claimed in claim 11, wherein the saliency map is a map of the local saliency maxima of the image.

13. A method as claimed in claim 8, further comprising:
defining a viewing window for the or each image; and
moving the viewing window across the or each image along the salient path.

14. A method as claimed in claim 13, wherein the image is two-dimensional, and an area of the viewing window is less than the area of the image.

15. A method as claimed in claim 8, wherein the grouping kernel is a lemniscate Gaussian kernel.

16. A method as claimed in claim 8, further comprising:
generating at least one secondary salient path for the image using the saliency field, wherein at least part of the or each secondary salient path differs from the first-mentioned salient path.

17. A method as claimed in claim 16, further comprising:
receiving information about a preferred salient path; and
using information relating to the preferred salient path to select a path from the first-mentioned salient path or the or each secondary salient path.

18. A method as claimed in claim 17, wherein said information about the preferred salient path includes at least one of:
path length;
overall saliency of the path;
curvature of the path;
proximity of the path to the edges of the image;
available time to view salient portions of the image; and
available display size.

19. A method as claimed in claim 8, further comprising:
generating a second salient path for a second image; wherein
the end point of the salient path is adjusted if necessary in order to substantially correspond to a portion of the second salient path.

20. A method as claimed in claim 19, wherein the second image is related to the first-mentioned image.

21. A method of generating a salient path across a plurality of images, the method comprising:
for the respective images, generating, by a computing device, respective saliency maps;
determining the relationship of salient portions of the images using the saliency maps in order to generate respective saliency fields for respective said images;
generating at least one salient path for the respective images using the respective saliency fields; and
selecting a portion of the image for presenting for viewing based on the salient path and on a determination that the image is not directly viewable due to properties of a display on which the image will be provided;
wherein the salient paths are constrained at their respective end portions such that at least part of the salient path in one of said images substantially corresponds to part of the salient path in another of said images.

22. A method as claimed in claim 21, wherein each corresponding part of the salient paths is a beginning or end part of one of the paths.

23. A method as claimed in claim 21, wherein two paths substantially correspond to one another if at least one of the following criteria are satisfied:
the paths are continuous when joined;
a mismatch between the paths is below a mismatch threshold.

24. A device adapted to process at least one image, comprising a processing system that uses data relating to disposition and saliency of selected salient portions of the image, that generates at least one respective saliency vector for the selected salient portions, and that selects a portion of the image for presenting for viewing based on the at least one respective saliency vector and on a determination that the image is not directly viewable due to properties of a display on which the image will be provided.

25. A device as claimed in claim 24, operable to display at least a portion of the image using a display of the device.

26. A device as claimed in claim 25, further comprising a processor operable to receive data relating to a length of time available to view the image and determine the portion of the image to display on the basis of the received data.

27. A device operable to:
generate a saliency map for an image;
determine a relationship of salient portions of the image using the saliency map in order to generate a saliency field;
construct a salient path for the image using the saliency field; and
select a portion of the image for presenting for viewing based on the salient path and on a determination that the image is not directly viewable due to properties of a display on which the image will be provided.

28. A device as claimed in claim 27, the device further operable to display at least a part of the image along the salient path.

29. A device as claimed in claim 27, further comprising a processor operable to receive data relating to a length of time available to view the image.

30. A device as claimed in claim 29, wherein the processor is operable to determine a portion of the image to display on the basis of the received data.

31. A device as claimed in claim 27, further comprising at least one user operated interface, the device operable to process the image on the basis of data received from the or each user operated selection device.

32. A device as claimed in claim 31, wherein the at least one user operated interface is a multi-directional button, and the data relates to a direction of actuation of the button.

33. A device as claimed in claim 31, wherein the user operated interface is adapted to control a menu system of the device, the menu system operable to control a function of the processor of the device, the menu system including menu items relating to parameters of a generated salient path.

34. A device as claimed in claim 33, wherein the device is operable to facilitate display of at least a portion of the image on the basis of the menu item selected using the interface.

35. A non-transitory computer readable medium encoded with computer program instructions, comprising: processing an image using data relating to disposition and saliency of selected salient portions of the or each image; processing the image generating at least one respective saliency vector for respective said portions; and selecting a portion of the or each image for presenting for viewing based on the at least one respective saliency vector and on a determination that the image is not directly viewable due to properties of a display on which the image will be provided.

36. A logic circuit configured to operate using data relating to disposition and saliency of selected salient portions of the or each image, to operate generating at least one respective saliency vector for respective said portions; and to operate selecting a portion of the or each image for presenting for viewing based on the at least one respective saliency vector and on a determination that the image is not directly viewable due to properties of a display on which the image will be provided.

* * * * *